United States Patent Office 2,965,393
Patented Dec. 20, 1960

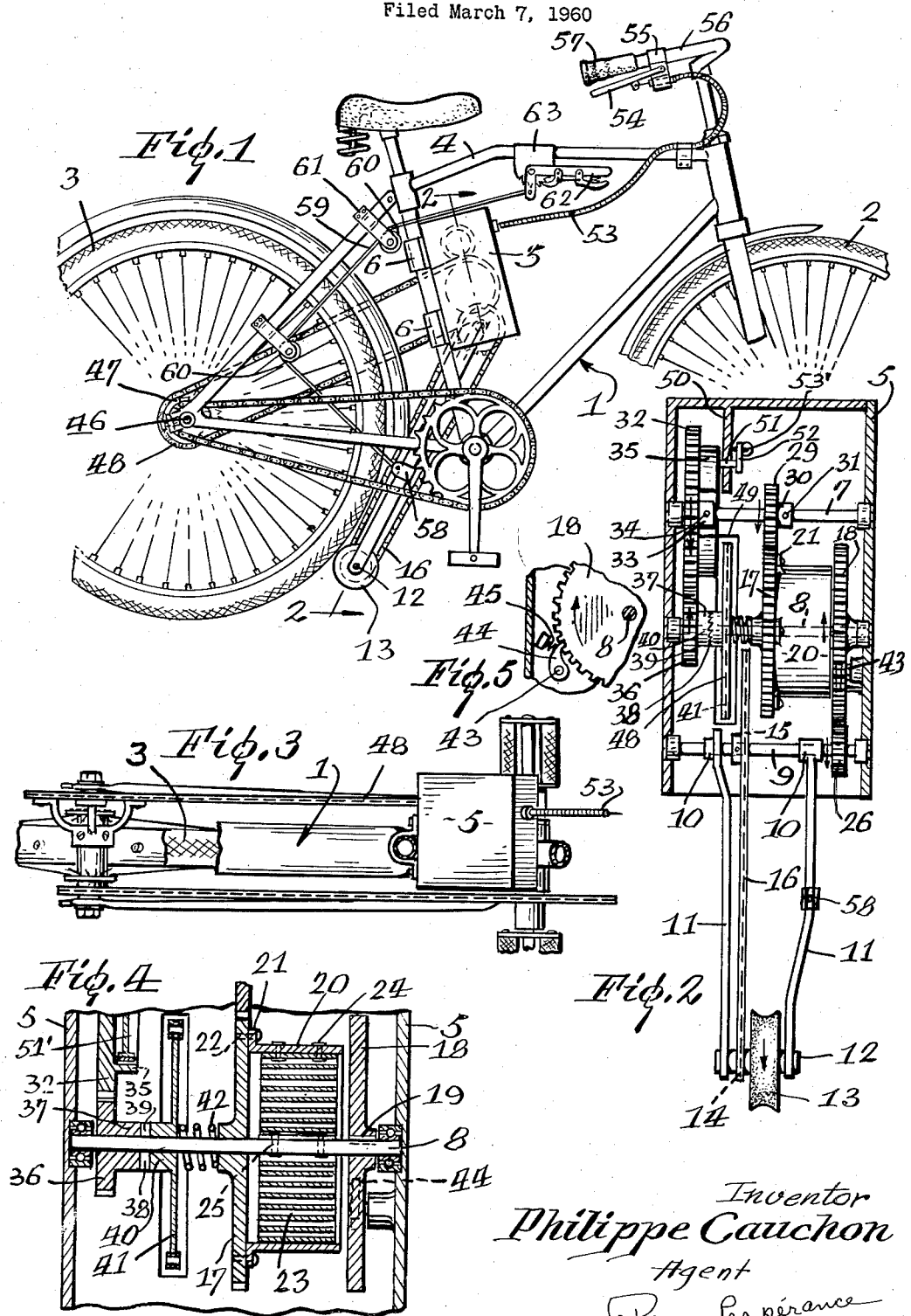

2,965,393

ENERGY STORING MEANS FOR BICYCLES

Philippe Cauchon, Desbiens, Lac St. Jean County, Quebec, Canada

Filed Mar. 7, 1960, Ser. No. 13,208

4 Claims. (Cl. 280—212)

The present invention relates to an attachment for bicycles.

The general object of the present invention is the provision of means on a bicycle for recuperating and storing the braking energy of the bicycle when going downhill and using said energy to assist in giong uphill, those means being used at least in part instead of the brakes and storing the energy otherwise wasted during braking.

Another important object of the present invention is the provision of energy storing means of the character described which is used as an attachment and can be installed on any existing bicycles.

Another important object of the present invention is the provision of a device of the character described which is easily controlled by the cyclist.

The foregoing and other important objects of the present invention will become more apparent during the following disclosure and by referring to the drawings, in which:

Figure 1 is a partial side elevation of a bicycle provided with the attachment in accordance with the invention;

Figure 2 is a cross-section along line 2—2 of Figure 1;

Figure 3 is a top plan view of the attachment showing the bicycle frame partly in section;

Figure 4 is a partial section similar to Figure 2 on an enlarged scale; and

Figure 5 is a partial section of some of the elements of the attachment.

Referring now more particularly to the drawings in which like reference characters indicate like elements throughout, Figure 1 shows a bicycle 1 of conventional construction and comprising a front idle wheel 2, a back driving wheel 3 mounted in a frame 4 on the central bar of which is mounted a box 5 by means of clamps 6. Shafts 7, 8 and 9 are transversely disposed and journaled within the box 5 in vertically spaced parallel relationship. Sleeves 10 are freely pivoted on the lower shaft 9 and each has a downwardly extending arm 11 which projects outwardly from the lower open end of the box 5.

The lower free ends of the arms 11 are interconnected by a stud shaft 12 on which is keyed a groove roller 13 and a small sprocket wheel 14. The roller 13 is adapted to frictionally engage the tire of the back wheel 3 to be driven by the latter.

A large diameter sprocket wheel 15 is keyed to shaft 9 between sleeves 10 and is connected to small sprocket wheel 14 by means of sprocket chain 16.

Two spaced gear wheels 17 and 18 are mounted on the intermediate shaft 8, gear wheel 17 being freely rotatable thereon while gear wheel 18 is keyed thereto, as shown at 19, in Figure 4. A cylindrical housing 20 is disposed between the two gear wheels and is secured to gear wheel 17 by means of ears 21 and rivets 22. A strong spiral leaf spring 23 is wound around shaft 8 within housing 20, its outer end being secured to said housing by rivets 24 and its inner end being secured to shaft 8 by rivets 25.

Gear wheel 18 meshes with the small diameter gear wheel 26 keyed to lower shaft 9; gear wheel 17 meshes in turn with a small diameter gear wheel 29 fixed to upper shaft 7 by means of its hub 30 and through pin 31. A large diameter gear wheel 32 is also secured to upper shaft 7 by means of its hub 33 and through pin 34. The gear wheel 32 is provided on one side thereof with a brake drum 35 and meshes with a small diameter pinion 36 freely mounted on intermediate shaft 8. The pinion 36 has a hub 37 provided with ratchet teeth 38 at its end face which are in ratchet engagement with the ratchet teeth 39 of the hub 40 of a large diameter sprocket wheel 41 freely mounted on shaft 8 and urged against the ratchet teeth 38 of pinion 36 by means of coil spring 42 surrounding shaft 8 and interposed between gear wheel 17 and sprocket wheel 41.

Mounted on the side of the box 5 is a stud shaft 43 on which is pivoted a pawl 44 (see Figure 5) which is engageable with the teeth of gear wheel 18 under action of spring 45 and prevents rotation of gear wheel 18 under unwinding action of spring 23.

The rear axle 46 of the bicycle driving wheel 3 is provided with an auxiliary sprocket wheel 47 on which is trained a sprocket chain 48 which is also trained on sprocket wheel 41 passing through an opening 49 made in the back wall of box 5.

A web 50 depends from the top wall of box 5 and a stud shaft 51 is journaled therein. One end of the stud shaft 51 enters within drum 35 and is connected to a brake shoe 51' (see Figure 4) which is spring urged in frictional contact with the internal surface of drum 35 in order to prevent rotation of gear wheel 32. The stud shaft 51 is rotated under action of crank 52 secured to the other end thereof and control cable 53 which extends to and is connected to actuating control lever 54 pivoted on bracket 55 secured to one of the guiding handles 56 of the bicycle, lever 54 being just underneath the hand grip 57. A spring 53' (see Figure 2) is attached to the crank 52 and to the box 5 and normally maintains the stud shaft 51 in an angular position such that the brake shoe 51' is in engagement with brake drum 35 to prevent rotation thereof. When the cyclist squeezes lever 54 it releases drum 35 and gear wheel 32.

One of the arms 11 supporting the grooved pulley 13 is provided with a connector 58 to which is attached a cable 59 trained on idle pulleys 60 attached to the rear arms of the bicycle frame 4 by means of brackets 61. The front end of the cable 59 is attached to a tightening lever 62 provided with a stop pawl and mounted by means of bracket 53 on the frame 4 in a position readily accessible to the cyclist.

In the use of the invention when going downhill instead of applying the brakes, the cyclist tightens cable 59 by means of lever 62 so as to cause grooved pulley 13 to frictionally engage the tire of the back driving wheel 3 of the bicycle. The gear wheel 17 and drum or housing 20 being held stationary due to the stopping action of the brake shoe 51' engaging brake drum 35, the spiral spring 23 is wound and stressed because intermediate shaft 8 is rotated through gear wheels 18 and 26, shaft 9, sprocket wheels 14 and 15, the chain 16, and grooved pulley 13. When the spring 23 is completely wound, groove pulley 13 stops its rotation and simply slides on the tire of the rear wheel 3. Pawl 44 engaging the teeth of gear wheel 18 prevents unwinding of the spring 23 upon release of lever 62.

When it is desired to use the energy stored in wound spring 23, the stop lever 62 having been previously released to disengage roller 13 from back wheel 3, the cyclist simply presses on handle lever 54 to thereby release the brake shoe 51'. Under these conditions, wound spring 23 causes rotation of gear wheels 17 and 29, shaft 7, gear wheels 32 and 36, and sprocket wheel 41 through the intermediary of interengaging ratchet teeth 38 and 39. Sprocket wheel 41 exerts a forward action on the back wheel 3 of the bicycle through chain 48 and sprocket wheel 47. When the spring 23 has been completely unwound, continued forward movement of the bicycle will not wind the spring in the opposite direction because of the escapement provided by ratchet teeth 38 and 39. This escapement also allows rotation of sprocket wheel 41 and bicycle wheel 3 when gear 17 is blocked during winding of spring 23.

While a preferred embodiment in accordance with the present invention has been illustrated and described, it is understood that various modifications may be resorted to without departing from the spirit and scope of the appended claims.

What I claim is:

1. A bicycle attachment for selectively storing braking energy and applying same to drive the bicycle, comprising a housing attached to the bicycle frame, a first shaft mounted in said housing, an energy storing spring wound around said shaft and having its inner end secured thereto, a first gear freely mounted on said first shaft, the outer end of said spring being fast with said first gear, an arm pivoted on said housing, a friction roller mounted at the free end of said arm and engageable with the tire of one of the bicycle wheels to be rotated thereby upon swinging movement of said arm to a position close to said bicycle wheel, first transmission means connecting said roller with said first shaft to wind said spring, second transmission means connecting said first gear with said bicycle wheel, said second transmission means including braking means to block rotation of said first gear, and escapement means to allow rotation of said bicycle wheel when said first gear is blocked, first control means for releasing said braking means, and second control means for swinging said arm to a position with said roller in frictional contact with said bicycle wheel, whereby said roller winds and stores energy in said spring upon rotation of said roller when said first gear is blocked, and said wound spring furnishes driving energy to said bicycle upon release of said braking means.

2. A bicycle attachment as claimed in claim 1, wherein said first transmission means include pawl and ratchet means to prevent unwinding of said spring through said first transmission means.

3. A bicycle attachment as claimed in claim 2, wherein said first and second control means include levers mounted on said bicycle in positions accessible to the cyclist.

4. A bicycle attachment as claimed in claim 2, wherein said second control means for swinging said arm include a cable attached to said arm and a control lever mounted on the frame of said bicycle in a position accessible to the cyclist and connected to said cable.

References Cited in the file of this patent
UNITED STATES PATENTS

| | | |
|---|---|---|
| 1,374,797 | Zaborsky | Apr. 12, 1921 |
| 1,409,454 | Kolaczkowski | Mar. 14, 1922 |
| 1,442,556 | Bharucha | Jan. 16, 1923 |
| 2,638,359 | Crumble | May 12, 1953 |